US012611985B2

(12) United States Patent (10) Patent No.: US 12,611,985 B2
Baudu et al. (45) **Date of Patent: \*Apr. 28, 2026**

(54) MULTI-ALERT POSTURE ASSISTING SYSTEM IN A VEHICLE SEAT

(71) Applicant: FAURECIA Sièges d'Automobile, Nanterre (FR)

(72) Inventors: Samuel Baudu, Boulogne Billancourt (FR); Nour Besbes, Montrouge (FR); Laurent Carle, Maisse (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 54 days.

This patent is subject to a terminal disclaimer.

(21) Appl. No.: 18/402,015

(22) Filed: Jan. 2, 2024

(65) Prior Publication Data

US 2024/0217433 A1     Jul. 4, 2024

(30) Foreign Application Priority Data

Jan. 4, 2023     (FR) ...................................... 2300077

(51) Int. Cl.
| | |
|---|---|
| *G08B 21/00* | (2006.01) |
| *B60N 2/00* | (2006.01) |
| *B60Q 9/00* | (2006.01) |

(52) U.S. Cl.
CPC ............. *B60Q 9/00* (2013.01); *B60N 2/0027* (2023.08)

(58) Field of Classification Search
CPC ...... B60Q 9/00; B60N 2/0027; B60N 2/0268; B60N 2/0244

USPC .......................................................... 340/438
See application file for complete search history.

(56) References Cited

U.S. PATENT DOCUMENTS

| | | | | |
|---|---|---|---|---|
| 5,821,860 | A | * | 10/1998 | Yokoyama ........... B60K 28/066 |
| | | | | 340/576 |
| 2015/0366350 | A1 | * | 12/2015 | Di Censo ............. B60N 2/0278 |
| | | | | 700/275 |
| 2020/0254904 | A1 | * | 8/2020 | Karlsson .................. B60Q 9/00 |
| 2021/0197747 | A1 | * | 7/2021 | Yoshizawa ............. G06V 40/10 |
| 2023/0001930 | A1 | * | 1/2023 | Moidunny ............ A61B 5/1116 |

FOREIGN PATENT DOCUMENTS

EP          3470260 A1     4/2019

OTHER PUBLICATIONS

French Search Report for Priority French App. No. 2300077 dated Jun. 29, 2023, 8 pages, no English translation available.

* cited by examiner

*Primary Examiner* — Mark S Rushing
(74) *Attorney, Agent, or Firm* — Barnes & Thornburg LLP

(57) ABSTRACT

A method and a system for assisting in correcting the posture of an occupant of a vehicle seat, comprising:
  a. collecting the posture of the occupant of the seat via sensors;
  b. calculating comfort indices;
  c. comparing them with reference values;
  d. generating a first alert signal intended for a first alert device when a reference value is reached; and
  e. generating a second alert signal intended for first and/or second alert devices when another reference value is reached.

9 Claims, 7 Drawing Sheets

Collection of Measures — 1001

Calculation of index $C_{i,t}$ — 1002

Combination of indexes — 1003

Comparison to references — 1004

1005

Generation SIG1

$1005_1$  $1005_2$  $1005_3$

Generation signal IHM

Generation SIG2

1006

Updating

Overall Comfort: ★ ★ ★ ☆ ☆

Back Comfort: ★ ★ ★ ★ ☆

Pelvic Comfort: ★ ★ ☆ ☆ ☆

Leg Comfort: ★ ★ ★ ☆ ☆

MULTI-ALERT POSTURE ASSISTING SYSTEM IN A VEHICLE SEAT

PRIORITY CLAIM

This application claims priority to French Patent Application No. FR2300077, filed Jan. 4, 2023, which is expressly incorporated by reference herein.

BACKGROUND

The present disclosure relates to X, and particularly to Y. More particularly, the present disclosure relates to Z.

The present disclosure relates to the field of embedded vehicle systems.

SUMMARY

According to the present disclosure, a method for assisting in correcting the posture of an occupant of a vehicle seat comprises:

a. collecting signals from a set of sensors as input, the sensors being jointly arranged so as to detect the posture of the occupant of the seat;

b. for each time step t at least, calculating based on the signals collected a set of one or more comfort indices by implementing at least one algorithm;

c. comparing each of the one or more comfort indices of the set to at least one respective reference value;

d. generating as output at least one signal intended for a user interface when one of the reference values is reached by the respective comfort index, the signal being selected from several possible signals based on prerecorded parameters specific to the occupant;

e. upon receiving a command received from the user interface in response to the generated signal, updating the prerecorded parameters specific to the occupant.

In illustrative embodiments, an embedded system of a vehicle is proposed comprising:

a seat able to receive an occupant of the vehicle;

a set of sensors jointly arranged so as to detect the posture of the occupant of the seat and at least part of which are integrated into the seat;

a user interface able to receive commands from a user and to transmit information to the user; and a controller able to receive, as input, signals from the set of sensors and commands from the user interface, and to generate as output signals intended for the user interface. The controller is further configured to perform a method defined herein.

The features disclosed in the following paragraphs can optionally be implemented independently of one another or in combination with one another:

In illustrative embodiments, the method further comprises:

generating as output at least one actuation signal of an equipment item of the vehicle so as to implement a countermeasure when one of the reference values is reached by the respective comfort index.

In illustrative embodiments, the method further comprises:

e. upon receiving a command received from the user interface in response to the generated signal, and based on the received command, updating at least one behavioral parameter from the prerecorded parameters specific to the occupant.

In illustrative embodiments, at least one reference value is based on prerecorded parameters specific to the occupant. The method can therefore adapt to each potential occupant.

In illustrative embodiments, the series of operations is repeated at least once. The method can therefore be iterative and implemented substantially continuously.

In illustrative embodiments, the values of the comfort indices and/or the reference values evolve with time t, so that a reference value can be exceeded in a situation wherein the signals from the set of sensors correspond to the absence of detection of change in the occupant's posture over time t. The method also takes into account the harmful effect of an excessively fixed posture.

In illustrative embodiments, a method is proposed for assisting in correcting the posture of an occupant of a vehicle comprising:

a. collecting signals from a set of sensors, the sensors being jointly arranged so as to detect the posture of the occupant of the seat;

b. for each time step t at least, calculating based on the signals collected a set of one or more comfort indices by implementing at least one algorithm;

c. comparing each of the one or more comfort indices of the set to at least one first reference value and at least one second reference value;

d. generating as output at least one first alert signal intended for a first alert device when the first reference value is reached by a first predetermined comfort index of the set;

e. generating as output at least one second alert signal intended for the first alert device and/or a second alert device when the second reference value is reached by the first predetermined comfort index and/or a second predetermined comfort index of the set.

In illustrative embodiments, the values of the comfort indices and/or the values of the first and second reference values evolving with time t, so that the first reference value or the second reference value can be reached in a situation wherein the signals from the set of sensors correspond to the absence of detection of change in the occupant's posture over time t.

The features disclosed in the following paragraphs can optionally be implemented independently of one another or in combination with one another:

The set of one or more calculated comfort indices comprises:

an instantaneous comfort index, compared with the first reference value, and a combined comfort index corresponding to the combination of one or more instantaneous comfort indices of several previous time steps, compared with the second reference value, so that the first alert signal is generated substantially in real time while the generation of the second alert signal is delayed.

This allows information to be provided substantially in real time to the user when the user wishes, for example when he attempts to modify his posture, while preventing relatively irrelevant alerts from being generated at the slightest movement of the occupant.

The combined comfort index corresponding to the combination of one or more instantaneous comfort indices of several prior time steps extends over a total period of time between 1 and 30 minutes, and preferably between 5 and 20 minutes. Such an order of magnitude of the sliding window studied has shown good results.

The method further comprises:

f. interrupting the first alert signal and the second alert signal or keeping them inactive when the first predetermined comfort index stops reaching the first reference value, so that the two signals are stopped substantially in real time.

This makes it possible to avoid maintaining unpleasant alerts even though the situation has been corrected quickly by the occupant.

The first reference value and the second reference value are different from one another, so that generating the first alert signal and generating the second alert signal differ by quantitative differences in the set of one or more comfort indices. This excludes the particular cases where two strictly identical references would be used.

In illustrative embodiments, an embedded system of a vehicle is proposed comprising:

a seat able to receive an occupant of the vehicle;

a set of sensors jointly arranged so as to detect the posture of the occupant of the seat and at least part of which are integrated into the seat;

a first alert device and a second alert device; and a controller able to receive signals from the set of sensors as input and to generate as output at least one first alert signal intended for the first alert device and a second alert signal intended for the second alert device.

The controller is further configured to implement a method defined above.

According to another aspect, a computer program is proposed comprising instructions for implementing all or part of a method as defined herein when this program is executed by a processor. According to another aspect, a non-transitory computer-readable recording medium is proposed whereupon such a program is recorded.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows a system intended to be embedded in a vehicle.

DETAILED DESCRIPTION

It is specified that, herein and in the context of vehicle seats, the term "comfort" is used within the meaning of improving human health and safety, and not only in its subjective sense of "pleasure" or "pleasant." In other words, the purpose is to improve safety in the field of passenger transport. Improving how the occupant feels in a seat may be an additional, but secondary, advantage. In this case, the "occupant" refers to the person installed in the seat and whose posture is monitored, while the "user" rather refers to a person who is a target of alerts and information. Depending on the application context, the occupant and the user may or may not be the same person. It is also specified that herein, the term "controller" is used in its general sense of a device capable of processing data, such as a system of software components capable of interacting to implement a computer method. Thus, the controller may for example take the form of an integrated circuit (or "ASIC" for "Application-Specific Integrated Circuit"), an electronic control unit (or "ECU"), a processor (or CPU for "Central Processing Unit") or a combination of several of the aforementioned elements. In particular, the controller may form a separate component or be a function integrated into an on-board computer among other functions implemented by the on-board computer. The controller is therefore defined here by its function, that is, for what it is configured rather than by its physical structure.

Figures 1, 2:
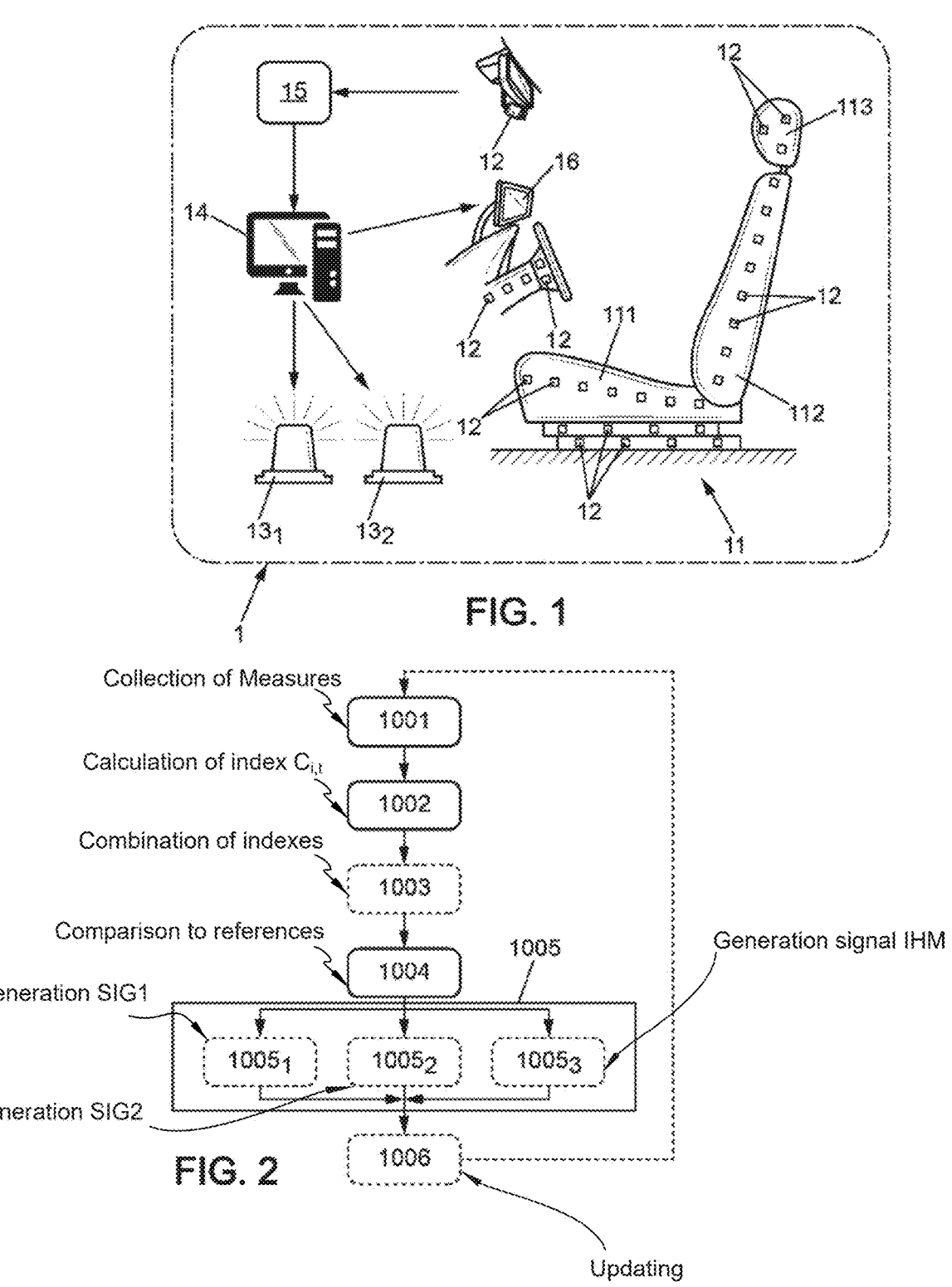
FIG. 2 shows a diagram for implementing a method according to one embodiment.

Reference is now made to [FIG. 1]. [FIG. 1] shows a system 1 embedded in a vehicle, or provided to be. In the example described here, the system 1 comprises:

a seat 11;

a set of sensors 12;

a first alert device $13_1$ and a second alert device $13_2$; and a controller 14;

a user interface 16.

The outputs of the sensors 12 are connected to an input of the controller 14, while an output of the controller 14 is connected to the input of the alert devices $13_1$, $13_2$ and of the user interface 16. The user interface 16 is also connected to an input of the controller 14.

The seat 11 is able to receive an occupant of the vehicle, for example a driver, a pilot or a passenger. In the example described here, the seat 11 comprises a seat cushion 111, a backrest 112 and a headrest 113. The seat 11 is further equipped with a set of moving parts and adjustment controls, not shown in [FIG. 1], mutually arranged to allow the position and orientation of the seat 11 to be modified relative to its environment (the rest of the vehicle), and also to allow the position and orientation of the parts composing the seat 11 to be modified relative to one another. In general, such adjustments allow the configuration of the seat 11 to be modified at will to help the occupant to adopt a desired posture.

The sensors of the set of sensors 12 are jointly arranged so as to detect the posture of the occupant of the seat. At least part of the sensors are integrated into the seat 11. The nature, the number and the position of the sensors can vary from one embodiment to another, in particular based on the intended usage context and compromise between the desired precision and the costs of manufacturing and implementing such a system. Examples of sensors that can be included in the set of sensors 12 are given below.

A pressure sensor is generally inexpensive. It can be integrated into one or more parts of the seat 11 such as the seat cushion 111, the backrest 112, the headrest 113 and/or an armrest.

A temperature sensor indirectly allows the occupant's posture to be deduced by detecting the body heat released by the occupant. By the effect of thermal inertia, temperature sensors further allow the prolonged presence of a part of the occupant's body to be distinguished from a brief positioning or movement. This is valid independently of a possible indexing of the measurements from the sensors with a time reference frame. In other words, when the signal output by a temperature sensor exceeds a predetermined temperature value, it is possible to deduce the presence of a part of the occupant's body nearby for a duration greater than a few seconds or minutes, even in the absence of a history of past measurements.

A humidity sensor in particular allows discomfort to be deduced by detecting an abnormally high humidity, for example, resulting from the occupant's sweat. Like for the temperature sensor, a humidity sensor makes it easier to distinguish the prolonged presence of a part of the occupant's body from a brief positioning or movement.

Interdigitated capacitive sensors, due to their fineness and flexibility, are particularly suitable for integration into the seat 11, for example, under a surface layer, for example made of fabric. Interdigitated capacitive sensors can be arranged very close to the occupant without, however, causing any discomfort for the occupant.

Hall effect sensors are particularly precise and solid, and therefore reliable. Because they are sensitive to magnetic fields, they may in particular be used to measure the relative position (or orientation) between two metal parts of the seat 11 or between a metal part of the seat 11 and a metal part of the vehicle distinct from the seat. Measuring such positions allows the deduction of information on the occupant's posture.

A video sensor, of a nature different from that of the preceding examples, can be arranged to capture an image of at least part of the occupant of the seat 11, for example the upper part, above the waist. Such a video sensor then includes a hardware part, for example a camera, and a software part, for example an image analysis module 15. The camera is then connected at the output to the image analysis module 15 to process the video signal. The video signal is converted into digital data representative of the occupant's posture. The image analysis module 15 can be integrated into the video sensor itself or can be separate, for example forming part of a computer, such as the controller 14 and/or an on-board computer of the vehicle.

Based on their integration into the environment, the sensors of the set of sensors 12 can fulfill various functions. Whether it is of the nature of one of the preceding examples or of another type, each sensor may for example be:

a position and/or orientation sensor of a first part of the seat 11 relative to a second part of the seat 11;
 a position and/or orientation sensor of a part of the seat 11 relative to a part of the vehicle distinct from the seat 11.

Some of the sensors may further be associated with parts of the vehicle other than the seat 11 to deduce information on the occupant's posture. By way of example, in the context of a motor vehicle, the set of sensors 12 may comprise a position and/or orientation sensor of a steering wheel, a seat belt attachment fitting or a mirror (or "rear view mirror") of the vehicle. Additionally, some sensors can be integrated into a human-machine interface and for example take the form of a physical or virtual button allowing a user to transmit, through an intentional action, information relating to his posture in the seat.

Each of the alert devices $13_1$, $13_2$ is able to emit an alert which is perceptible to at least one occupant of the vehicle. Although we refer to a singular alert, each alert device $13_1$, $13_2$ can also be capable of emitting a plurality of alerts. Each alert device $13_1$, $13_2$ is configured to emit the alert upon receiving a control signal, or alert signal SIG1 and SIG2, respectively, from the controller 14. The alert may be binary, so that it is emitted upon receiving the alert signal SIG1, SIG2 and is not emitted in the absence of receipt of the alert signal. The alert may alternatively have a variety of forms or a combination of forms that depend on the alert signal SIG1, SIG2 received and therefore, as will be described below, on the results of the computer method implemented by the controller 14. A composite form alert thus allows a wide variety of information to be transmitted to the user, as will be exemplified below.

Figure 6:
FIG. 6 shows an example of a rendering intended for an occupant of a vehicle seat with a visual depiction of various indices relating to the occupant's posture.

Each alert device $13_1$, $13_2$ can for example generate a visual alert. The alert device 13 may for example comprise a light or a combination of indicators whose illumination corresponds to an alert or several distinct alerts. Alternatively, a visual alert can be generated via a display screen, or a part of a screen, visible to an occupant of the vehicle. Examples of such displays are shown in [FIG. 3], [FIG. 4], [FIG. 5], [FIG. 6] and [FIG. 7]. Of course, the content of the display can be supplemented by other information intended for the vehicle occupants. In particular, the alert may constitute one piece of information among others displayed on the screen: the display of the alert is for example one component among others that a dashboard computer provides to occupants.

In order to limit visual distractions, which is particularly important when the occupant is also a driver or a pilot, visual alerts can be completed or replaced by other types of alerts, for example sound or haptic alerts. To this end, each alert device $13_1$, $13_2$ can for example:

comprise a loudspeaker and be controlled to emit a sound or a voice message as an alert; and/or
 comprise one or more vibrating units, for example integrated into the seat 11, activating to form an alert.

In the examples of application described below, it is considered that the first alert device $13_1$ comprises a screen capable of displaying visual alerts while the second alert device $13_2$ comprises a loudspeaker capable of emitting sound alerts. This example is particularly suitable for a usage context wherein the first alert device $13_1$ is rather considered to be intended to inform a user in real time and discreetly, while the second alert device $13_2$ is instead intended to draw the user's attention after a time delay and more conspicuously. Indeed, the user can, at will, consult the information or ignore it, while it may more difficult to ignore a sound alert.

It will be understood that the alert devices $13_1$, $13_2$ have the technical function of alerting and informing, and that the examples of alert devices $13_1$, $13_2$ above are illustrative and non-limiting. The ways that the information or alerts can be presented to users are virtually infinite and are not, as such, the subject matter of the improvement described herein.

In some embodiments, one or both alert devices $13_1$, $13_2$ can constitute a subset of the user interface 16, for example a touchscreen integrated into a dashboard. Thus, the alerts can take the form of a display on the screen, integrated into other information on the screen.

The controller 14 is able to receive signals from the set of sensors 12 as input and to generate as output at least one signal intended for one and/or the other of the alert devices $13_1$, $13_2$. The controller 14 is able to receive signals from the user interface 16 as input and to generate as output at least one signal bearing information intended for the user interface 16. The controller 14 is further able to transmit control signals to other optional equipment items of the vehicle.

In some embodiments, at least part of the hardware resources of the controller 14 (calculation and/or memory) can be distinct and remote from the vehicle. In other words, the method disclosed below can be implemented, in part, remotely. The set of sensors 12 and the alert devices $13_1$, $13_2$ can be connected to the controller 14 via communication networks. In particular, in contexts of use for which the latency is not a critical parameter, implementing a remote controller 14 allows desired configuration of the resources; a single controller can be used in combination with a plurality of sets of sensors and alert devices embedded in a plurality of vehicles. Such a network operation also facilitates the analysis of the data obtained and the improvement of the models implemented.

The user interface 16, or "HMI" for Human-Machine Interface, refers to any module that allows a two-way exchange between the controller 14 and a user. The example of a touchscreen, optionally associated with a microphone and a loudspeaker, is adapted to most of the usage contexts, in particular because it involves suitable equipment, which dispenses with the addition of hardware components specific to the system 1.

The system 1 can be integrated, in the sense that at least some of these hardware components are shared with another system of the vehicle and that it is generally installed during the manufacture or assembly of the vehicle in the factory. Alternatively, the system 1 can be added in the sense that it is added to a preexisting vehicle.

Reference is now made to [FIG. 2]. [FIG. 2] is a functional diagram of an embodiment of a method, implemented by a controller, assisting with the correction of the posture of an occupant of a vehicle seat. Subsequently, the numerical references used with reference to [FIG. 1] are reused to designate elements that may be similar. In particular, the method can be implemented by the controller 14 described above.

In a first operation 1001, signals from a set of sensors 12 are collected. Thus, the controller 14 receives the signals from the sensors as input and can use the data carried by these signals to deduce information on the occupant's posture therefrom. In the example described here, the signals obtained are raw and are processed by the controller 14. Alternatively, intermediate processing of the signals can be carried out upstream of the reception by the controller 14. In one embodiment comprising a video sensor as described above, an image analysis module 15 can be activated and process the video signal output by the video sensor and upstream of the controller 14.

When at least one of the signals from the set of sensors is a video signal, the method may optionally comprise, before the calculation of the comfort indices $C_{i,t}$, $C_{i,T}$ described below:

a1. performing an analysis of images from the video signal so as to convert the video signal into digital data representative of the posture of the occupant of the seat.

Using a video sensor allows detection of a large number of parameters related to the posture. The use of such a sensor can therefore replace or supplement a large number of other sensors while providing measurements and data that are sometimes more reliable and precise. Additionally, such a video sensor is already available in certain vehicles for other functions.

In a second operation 1002, a set C of one or more comfort indices $C_{i,t}$ is calculated for each time step t by implementing at least one algorithm. The calculation is based at least on the signals collected during the first operation 1001. In other words, the data drawn from the signals received from the occupant's posture sensors 12 are at least in part the inputs, parameters or variables of the algorithms implemented during the second operation 1002. Each comfort index $C_{i,t}$ is calculated by implementing at least one algorithm. In the example described below, each comfort index $C_{i,t}$ is calculated by implementing an algorithm different from those implemented for the other comfort indices $C_{j,t}$, $C_{k,t}$, etc. For each comfort index $C_{i,t}$, a value is calculated for each time step t.

In some embodiments, the time t itself is further a parameter for calculating a comfort index $C_{i,t}$. In other words, the value of the comfort index $C_{i,t}$ is dependent on both the posture of the occupant as detected by the sensors 12 and the time. Thus, the value of the comfort index $C_{i,t}$ changes from one time step t to the next t+1 (it is not constant), even when the occupant's posture does not change from the time step t to the next t+1, for example because the occupant is immobile in the seat.

Some examples of indices $C_1$ that it is relevant to calculate are now given as well as examples of corresponding calculation algorithms. It will be noted that the first two examples which follow are dependent on the time that passes.

A first example of an index, indexed i=1, is representative of the comfort related to the time spent by the occupant in the seat: $C_{i,t}$. Such an index can be constructed to decrease as the occupant spends time in the seat and to be reset when the occupant sits down in the seat. The decrease in the index can be linear relative to time. The index $C_{i,t}$ may for example be calculated according to the formula [Math. 1] below.

$$C_{1,t} = C_{1\_init} - F \times (t - t_{stop})$$ [Math. 1]

$C_{1\_init}$ being a predetermined initial or ideal value of the index; for example, each value $C_{i\_init}$ of the indices $C_i$ described herein is set at 80;

F being a constant factor, for example equal to 29/5400;

t being the current date;

$t_{stop}$ being the date of the installation of the occupant in the seat, determined based on the signals from the sensors.

A second example of an index, indexed i=2, is representative of the comfort related to the duration spent by the occupant in a fixed posture: $C_{2,t}$. Such an index can be constructed to decrease as the occupant remains fixed (immobile) and to be reset when the occupant changes posture in the seat. The decrease in the index can be linear relative to time. The index $C_{2,t}$ may for example be calculated according to the formula [Math. 2] below.

$$C_{2,t} = C_{2\_init} - E \times z \times (t - t_{stop})$$ [Math. 2]

$C_{2\_init}$ being a predetermined initial value of the index;

E being a constant factor, for example equal to 1.6 F, z being the part of the time spent in a fixed posture with respect to the time spent in the seat since the installation of the occupant in the seat, for example calculated according to the equation [Math. 3] below, a fixed posture being distinguished from the others based on the signals from the sensors.

$$Z = \frac{\text{cumulative time in fixed posture}}{(t - t_{stop})} \qquad \text{[Math. 3]}$$

$$z = \frac{(t - t_{stop}) - \text{cumulative time in motion or in a non-compliant posture}}{(t - t_{stop})}$$

A third example of an index, indexed i=3, is representative of the comfort related to the position of the occupant's pelvis in the seat, or of discomfort linked to the drift of the occupant's pelvis in the seat; $C_3$. In the example described here, the index $C_3$ is a discrete value, which varies based on the position of the occupant's pelvis in the seat. Alternatively, the index $C_3$ may be a Boolean, that is, it may have one fixed value when the position of the pelvis is compliant and another fixed value when it is not compliant. In the example described here, the index $C_3$ may for example be calculated according to the formula [Math. 4] below.

$$C_3 = C_{3\_init} - A \times W \qquad \text{[Math. 4]}$$

$C_{3\_init}$ being a predetermined value of the index corresponding to a position of the occupant's pelvis in the seat, considered to be ideal;

A being a constant factor, for example equal to 10/(7200*10);

W being a value of the drift of the occupant's pelvis relative to a position considered to be ideal and determined from the signals from the sensors.

A fourth example of an index, indexed i=4, is representative of the comfort related to the curvature of the occupant's back in the seat, or of discomfort linked to the curvature of the occupant's back in the seat: $C_4$. In the example described here, the index $C_4$ is a discrete value, which varies based on the curvature of the occupant's back in the seat. Alternatively, the index $C_4$ may be a Boolean, that is, it may have one fixed value when the curvature of the back is compliant and another fixed value when it is not compliant. In the example described here, the index $C_4$ may for example be calculated according to the formula [Math. 5] below.

$$C_4 = C_{4\_init} - B \times X \qquad \text{[Math. 5]}$$

$C_{4\_init}$ being a predetermined value of the index corresponding to a curvature of the occupant's back in the seat, considered to be ideal;

B being a constant factor, for example equal to 10/(7200*10);

X being a value of the curvature of the occupant's back relative to a curvature considered to be ideal and determined from signals from the sensors.

In the above examples, four indices are provided. Alternatively, the number of indices can be different, for example between one and ten.

In some embodiments, it is desirable to customize the behavior of the system, that is, to provide that the method implemented is adapted to the occupant and/or the user. To this end, a "profile," that is, a set of customized and specific data for each potential occupant/user, can be collected (recorded) beforehand and then made available to the controller 14. The controller 14 then has prerecorded parameters specific to the occupant. Hereinafter, the term "profile" is used to designate such a set of parameters. A profile may in particular comprise two types of parameters: behavioral parameters and non-behavioral parameters. Among the non-behavioral parameters, mention may be made, for example, of anthropometric, physiological, pathological parameters, an age and a sex of the occupant. In the present context, the anthropometric parameters may include morphological parameters such as weight and/or body dimensions. Physiological parameters for example include body temperatures, humidity, heart rate and/or an indicator specifying whether or not the occupant is a pregnant woman. Non-behavioral parameters may further include subjective data, for example:

a period of occupancy of a seat at the end of which the occupant generally considers that discomfort or pain is felt;

a list of the body areas or limbs which are usually subject to discomfort or pain (neck, upper back, lower back, pelvis, legs, wrists, etc.);

a list of countermeasures which the occupant declares they are ready to receive or implement (break, massage of one or more parts of the body, stretching, relaxation, breathing exercises, etc.), occupant/user preferences.

Behavioral parameters may for example include:

the predetermined initial values $C_{i\_init}$;

the reference values $C_{i,Ref}$, $C_{i,Ref1}$, $C_{i,Ref2}$ disclosed below;

the calculations variables W, X and z;

the values of the comfort indices $C_{i,t}$, $C_{i,T}$.

Custom data can be used in different ways as parameters for customizing the system's method and behavior. In the above examples of indices, as in other embodiments, it is possible to update the behavioral parameters such as the predetermined initial values $C_{i\_init}$. In other words, the values $C_{i\_init}$ can be both specific to the occupant and be evolving, that is, be updated by the system itself. The value of $C_{i\_init}$ can thus vary from one occupant to another and as the method is implemented. Conversely, the non-behavioral parameters, such as the morphological parameters for example, are not intended to be updated by implementing the method. Finally, before implementing the method, the behavioral parameters can take default values, for example calculated from the values of the non-behavioral parameters.

A set C of one or more comfort indices $C_{i,t}$ for the time step t may also comprise a comfort index which is itself a combination of other comfort indices $C_{i,t}$ of the same time step t. For example, a global comfort index $C_{G,t}$ can be calculated as a combination of comfort indices $C_{i,t}$ among those described above. In the example described here, the global comfort index $C_{G,t}$ is calculated as a sum or an average, weighted or not, of the indices defined above. The global comfort index $C_{G,t}$ may for example be calculated according to the formula [Math. 6] below.

$$\sum_{i=1}^{n} a_i \times \frac{C_{i,t}}{n} \qquad \text{[Math. 6]}$$

N being the number of indices involved in the calculation of the global comfort index, with n=4 in this example, and $a_i$ being a weighting coefficient (the weighting coefficients all being able to be equal).

The above calculation formula corresponds to an embodiment of an unweighted sum (or, equivalently, with equal weights from one index to another). Alternatively, weightings specific to each index can be applied. In particular, the weighting coefficients can be set by default or depend on customized data. Thus, if an occupant indicates, via the user interface 16, that they are particularly sensitive or subject to back pain, the weighting coefficients can be selected to make the indices related to back comfort predominant in the calculation of the global comfort index. The same applies, for example, for occupants for whom certain morphological data deviate from the data of a general population, for example a large person.

Of course, the examples of indices above are illustrative and non-limiting: other algorithms can be implemented and other comfort indices can be calculated from information drawn from the sensor signals. In particular, other local indices (indices linked to parts of the occupant's body other than the torso) can be calculated, for example linked to the legs, feet, arms and/or the neck/head.

In the above examples, the indices are calculated by means of explicit and determined equations. Alternatively, the calculation of at least one of the comfort indices $C_{i,t}$ further depends on at least one predictive model constructed beforehand by machine learning. The construction of such models and their evolutions can be favored by implementing the methods described here in a centralized manner, for a plurality of vehicles. Indeed, the large volume of data received by a "central" controller (processing data coming a large number of sets of sensors) can be used to power the learning base of the machine constructing the model (or correcting it).

During the second operation 1002 and according to the examples above, the indices $C_{i,t}$ are calculated separately for each time step t. Such indices $C_{i,t}$ can therefore be qualified as "instantaneous." They can be calculated substantially in real time (excepting the calculation time and time to process the signals from the sensors).

In some embodiments, an optional third operation 1003 can be implemented: "combined" comfort indices (or "delayed" comfort indices, as opposed to the "instantaneous" indices referred to above) denoted "$C_{i,T}$" are calculated. The combined indices correspond to the combination of one or more instantaneous comfort indices ($C_{i,t-n}$; . . . ; $C_{i,t}$) of several previous time steps. They can also be calculated for each time step t. Such a combination can for example take the form of a sum or an average, weighted or not, of the instantaneous indices $C_{i,t}$ of the prior time steps. This third operation 1003 and the combined comfort indices $C_{i,T}$ thus obtained are optional but particularly advantageous when it is desired to provide information after a time delay and to emit a type of alert only when an incorrect posture is adopted for a duration greater than a time step t. This makes it possible to limit the oppressive feeling that a user receiving alerts may experience by favoring the alerts relating to sustained postures rather than to fleeting postures or movements of the occupant. After tests, the applicant has determined that considering prior time steps t extending over a total period of time comprised between one and thirty minutes, and preferentially between five and twenty minutes, produced good results.

In a fourth operation 1004, the set C of comfort indices $C_{i,t}$ (and if applicable, $C_{i,T}$) is compared with at least one reference value. In the examples described here, each calculated comfort index $C_{i,t}$, $C_{i,T}$ is compared with a (single) corresponding reference value or with a first corresponding reference value $C_{i,Ref1}$ and with a second corresponding reference value $C_{i,Ref2}$. In variants, only some of the calculated indices are then compared with one or more reference values. For example, when combined indices are calculated from the instantaneous indices (implementation of the third operation 1003), only the combined indices can be subject to comparisons with reference values. This may be the case, for example, if it is desired to generate alerts only in response to sustained incorrect postures, which does not prevent the user from being provided with "instantaneous" information based on the instantaneous indices without generating an alert.

The reference values are predefined. The comparison operation aims, for each index and each time step t, to determine whether or not the value of each index is within a nominal range considered to be "normal." In the embodiments for which the value of an index is compared with two reference values $C_{i,Ref1}$ and $C_{i,Ref2}$, the comparison operation aims to determine more precisely whether the value of the index is within a first nominal range considered to be "normal" (for example less than both reference values), in a second "abnormal but non-critical" range (for example between the two reference values), or in a third "abnormal and critical" range (for example greater than the first as well as the second reference value). It will be noted here that, when it is not desired to be able to generate two different types of alert, performing a comparison with two reference values is superfluous: a comparison with a single reference value can be sufficient.

In the examples described herein, it is assumed that the comfort indices have positive values that vary from a maximum value, for example 100, corresponding to maximum comfort and decrease when comfort is reduced to a minimum, for example zero. The first reference value $C_{i,Ref1}$, for example a constant value of 80, has a value greater than that of the second value of $C_{i,Ref2}$, for example a constant value of 60. Of course, this is only one example which depends on the algorithmic construction of the indices: it is equivalent to using negative values or to establishing a scale of values wherein the value of the indices would increase when the comfort decreases. The comfort indices should then rather be called discomfort indices. It will also be noted that, based on the calculation mode of each index, providing a value beyond which the "comfort" can be considered "abnormally high" may in practice correspond to an undesirable situation, for example favorable to a reduction in the attention and reactivity of a driver occupant, or even favorable to drowsiness.

In some embodiments, the reference value(s) are not constants but, on the contrary, change with time t. Making the calculated value of the comfort indices $C_{i,t}$, $C_{i,T}$ dependent on time t as explained above, or making the reference value(s) $C_{i,Ref}$, $C_{i,Ref1}$, $C_{i,Ref2}$ themselves dependent on time t, or making both the values of the comfort indices $C_{i,t}$, $C_{i,T}$ and the reference value(s) $C_{i,Ref}$, $C_{i,Ref1}$, $C_{i,Ref2}$ dependent on time t are substantially equivalent means to provide that the results of the comparison carried out during the fourth operation 1004 evolve over time t, including in a situation wherein the signals from the set of sensors 12 correspond to the absence of detection of change in the occupant's posture over time t. In other words, a fixed posture of the occupant of the seat for a certain period of time irreparably leads to a situation wherein a comfort index approaches a reference value and passes from a nominal range considered to be "normal" to a range considered to be "abnormal," or even "critical."

The reference values $C_{i,Ref}$, $C_{i,Ref1}$, $C_{i,Ref2}$ can therefore be time-dependent as indicated above. Additionally, the reference values $C_{i,Ref}$, $C_{i,Ref1}$, $C_{i,Ref2}$ can also depend on prerecorded parameters specific to the occupant, that is, the profile mentioned above. For example, for an occupant who has indicated that they are normally subject to lower back pain, it may be relevant to transpose this information into the calculation of the reference value of a relative comfort index in the lower back. For the occupant, a reference value of one of the calculated indices $C_{Lower\_back,Ref}$ can be adjusted relative to a default value, so that it is considered that the index is in an abnormal range (of discomfort) even though, all conditions being equal, the same index for another occupant would be considered to be within a "normal" range. It is therefore possible to customize the reference values, which can therefore vary from one occupant to another. The dependency on the time t and the dependency on the occupant are options that can be implemented in isolation from one another or in combination with one another.

The first reference value $C_{i,Ref1}$ and the second reference value $C_{i,Ref2}$ can be defined to be different from one another, so that the generation of the first alert signal SIG1 and the generation of the second alert signal SIG2 are distinguished by quantitative differences in the set C of comfort indices $C_{i,t}$, $C_{i,T}$. In other words, the particular case of two equal references, which would be equivalent to the use of a single reference, is excluded here.

In a fifth operation 1005, at least one signal is generated as output (of the controller 14) when at least one of the comfort indices $C_{i,t}$, $C_{i,T}$ of the set C reaches (or exceeds) one of the reference values $C_{i,Ref}$, $C_{i,Ref1}$, $C_{i,Ref2}$. The fifth operation 1005 may comprise one or several of the three sub-operations $1005_1$, $1005_2$, $1005_3$ described in detail below.

The first sub-operation $1005_1$ comprises generating a first alert signal SIG1 intended for the first alert device $13_1$. The first alert signal SIG1 is generated when a first predetermined comfort index $C_{i,t}$ of the set C reaches (or exceeds) the first reference value $C_{i,Ref1}$. The second sub-operation $1005_2$ comprises generating a second alert signal SIG2 intended for the first alert device $13_1$ and/or the second alert device $13_2$. The second alert signal SIG2 is generated when the first predetermined comfort index $C_{i,t}$ and/or a second predetermined comfort index $C_{i,t}$, $C_{i,T}$ of the set C reaches (or exceeds) the second reference value $C_{i,Ref2}$. The third sub-operation $1005_3$ comprises generating a signal intended for the user interface 16. The signal is generated when one of the reference values $C_{i,Ref}$ is reached by the respective comfort index $C_{i,t}$, $C_{i,T}$.

Preferably, in particular when the third sub-operation $1005_3$ is implemented, the generated signal(s) are selected from several possible signals based on prerecorded parameters specific to the occupant/user. In other words, the nature of the alert and the perceived effect can be adapted by means of the profile, and therefore information which is specific to the occupant/user and previously recorded.

Thus, the occupant's profile data (the prerecorded parameters specific to the occupant) may or may not be input parameters in:

calculating the comfort indices $C_{i,t}$, $C_{i,T}$ (second and/or third operations 1002, 1003); and/or defining reference values $C_{i,Ref}$, $C_{i,Ref1}$, $C_{i,Ref2}$ used for the comparison (fourth operation 1004).

The data of the occupant/user profile (the prerecorded parameters specific to the occupant/user) may or may not be input parameters in:

selecting the generated signal when the generation conditions are met (fifth operation 1005).

The customization options in the calculation of the indices and the customization options in the reference values have substantially equivalent effects: they involve adapting, depending on the occupants, the conditions under which the system will detect discomfort, and therefore trigger signals via the controller 14. The customization relative to the selection of the signals to be generated has a different effect: this involves adapting, based on the occupants/users, the system's reaction once discomfort is detected. For example, when the generated signals include control signals intended for other components of the vehicle, it is possible to generate a signal able to trigger a neck massage device if and only if the occupant's specific parameters include information indicating that the occupant is favorable to the neck massage. Of course, this is an illustrative example and the nature of the generated signals can have a very wide variety based on the context.

The alert signals generated in sub-operations $1005_1$ and $1005_2$ are arranged so that the alert device which receives it emits upon receipt of an alert. Such an alert may be silent (intended for other components of the vehicle) and/or be perceptible by at least one occupant of the vehicle. The signals generated are dependent on the results of the comparison. For example, a signal can be emitted only when the results of the fourth comparison operation 1004 lead to a situation wherein at least one of the indices $C_{i,t}$, $C_{G,t}$ is outside a nominal range, while no signal is generated as long as each index is within its nominal range. In such a case, the alert devices $13_1$, $13_2$ can be configured to transmit information to the user, including by default in the absence of receipt of an alert signal from the controller 14. In alternative embodiments, a composite signal is generated: it carries various information, and is generated including when the indices are within their respective nominal ranges, for example periodically or quasi-continuously. Such a composite signal then comprises the first alert signal SIG1 and/or the second alert signal SIG2 when the conditions for their generation by the controller 14 are met.

In embodiments where it is desired in particular to adapt the nature of the alerts so as to adapt to the variability of user expectations over time, limit the occurrences of alerts perceived as intrusive and provide real-time information, implementing sub-operations $1005_1$ and $1005_2$ is advised. In embodiments where it is desired in particular for the system to adapt to each occupant/user, implementing sub-operation $1005_3$ is advised. The three sub-operations $1005_1$, $1005_2$, $1005_3$ are compatible with one another. It is therefore also possible to implement all three in a combined manner.

At the end of the fifth step 1005, an optional operation can be implemented:

interrupting the first alert signal SIG1 and the second alert signal SIG2 or keeping them inactive when the first predetermined comfort index $C_{i,t}$ stops reaching the first reference value $C_{i,Ref1}$. Thus, the two alert signals SIG1 and SIG2 are stopped substantially in real time, in particular if the occupant spontaneously implements a countermeasure, for example by repositioning.

At the end of the fifth step 1005, when the generation conditions are met (when one of the reference values $C_{i,Ref}$ is reached by the respective comfort index $C_{i,t}$), another optional operation may be implemented:

generating as output at least one actuation signal of an equipment item of the vehicle so as to implement a countermeasure.

Among the examples of equipment items whose activation corresponds to the implementation of a countermeasure, mention may be made, for example, of heating, cooling, air circulation or massage systems. Such countermeasures aim to reduce occupant discomfort.

At the end of the fifth operation 1005, an optional sixth operation 1006 can be implemented. The implementation of the sixth operation may or may not be conditional on the implementation of a countermeasure. Upon receipt of a command received by the controller 14 via the user interface 16, the prerecorded parameters specific to the occupant (the profile) are updated. Only some of the prerecorded parameters specific to the occupant can be updated, for example behavioral parameters. The user interface 16 may for example transmit (for example display or vocally announce) information to the user corresponding to the detection that the reference value has been reached by one of the indices calculated based on the signals from the set of sensors. To return to the previous example, the message may be: "In order to limit your discomfort, a lower back massage session will begin." The controller 14 can then wait for a receipt of a command via the user interface 16. If the user activates a command via the user interface 16, the command is transmitted by the user interface 16 to the controller 14. The command may for example be a command to confirm the activation of a countermeasure for the discomfort (here the activation of the massage), or on the contrary may be a refusal of the proposed countermeasure. Alternatively, the acceptance may be presumed and the countermeasure may be triggered without waiting for confirmation from the user. The updating of the occupant/user profile may consist in recording, confirming or invalidating a datum relating to the acceptance or refusal of the proposed countermeasure, here to receive a massage. Of course, the information and the nature of the countermeasures proposed by the system 1 can assume a wide variety of forms. Thus, in its perceived form, the system 1 can be seen as assistance or as a "coach" for the occupant/user. The update may be implemented during or after the implementation of a countermeasure.

Through such an update of the profile (sixth operation 1006), it becomes possible to adapt the behavior of the system 1 to the occupant/user, not only based on information recorded prior to the implementation of the method, but also based on the behavior of the occupant/user under real conditions.

Except for the calculated index values, the other elements of the user profile can be prerecorded or set to default values prior to implementing the method. The updating of the profile may be limited to some of the data constituting the profile. For example, the data relating to the following non-behavioral parameters may be updated during the implementation of the sixth operation 1006:

gender;

age;

height;

weight;

duration after which the user generally feels pain;

most sensitive areas of the body;

list of countermeasures to which the user is receptive;

while, on the contrary, the data relating to the following behavioral parameters may be updated during the implementation of the sixth operation 1006:

predetermined initial values $C_{i\_init}$;

reference values $C_{i,Ref}$, $C_{i,Ref1}$, $C_{i,Ref2}$ calculations variables W, X and z;

the values of the comfort indices $C_{i,t}$, $C_{i,T}$.

At the end of the series of operations 1001 to 1006 described above, the series can optionally be repeated at least once. In this case, the method is iterative. When such an iteration loop is implemented at the end of an update of the prerecorded parameters specific to the occupant/user, the method is dynamic (or self-adaptive): its behavior is refined over the course of the iteration loops by adapting to the behavior of the user/occupant. The method may be performed substantially continuously. Of course, stop or pause commands can be provided so that the system 1 is deactivatable.

The proposed method allows the countermeasures proposed in response to discomfort to be adapted dynamically, whether they are messages or advice addressed to the occupant and/or the activation of vehicle components.

Figures 3, 4, 5:
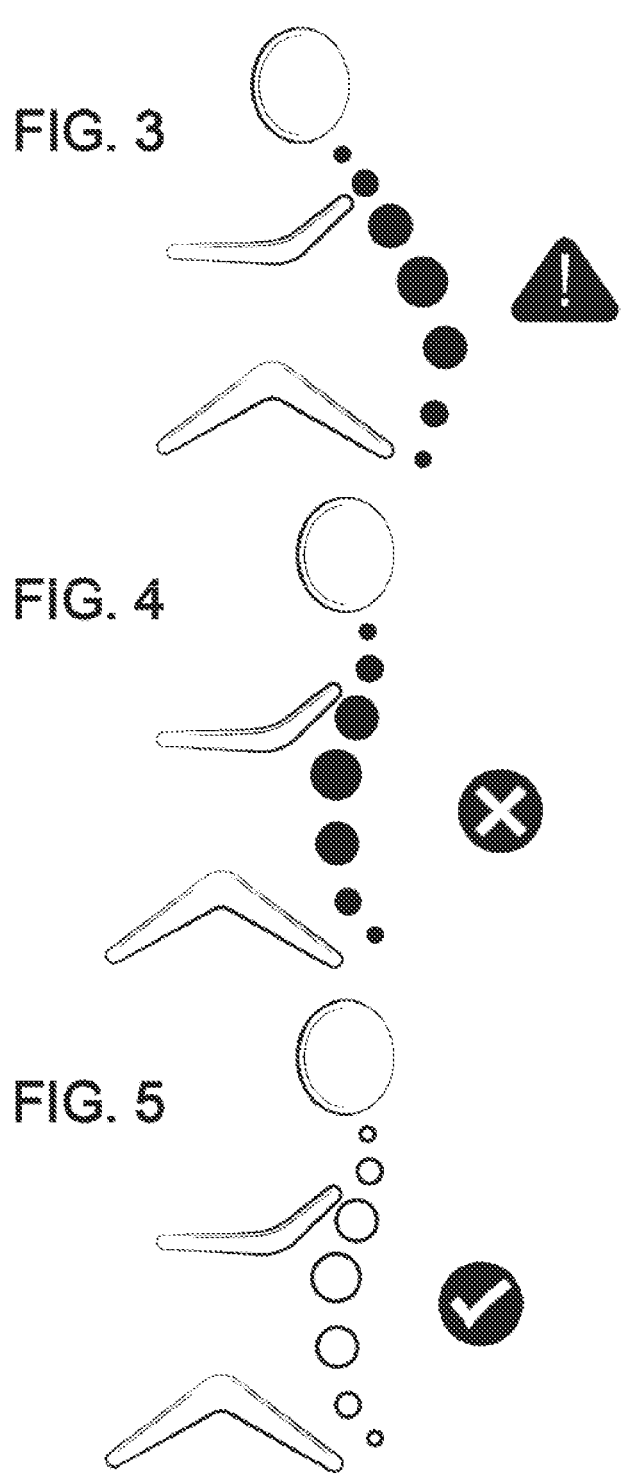
FIG. 3 shows an example of a rendering of an alert generated for an occupant of a vehicle seat with a visual depiction of an alert indicating an excessively curved and dangerous posture of the spine.
FIG. 4 shows an example of a rendering of an alert generated for an occupant of a vehicle seat with a visual depiction of an alert indicating an excessively curved but not imminently dangerous posture of the spine.
FIG. 5 shows an example of a rendering in the absence of an alert generated for an occupant of a vehicle seat with a visual depiction of a correct posture of the spine.
Figure 7:
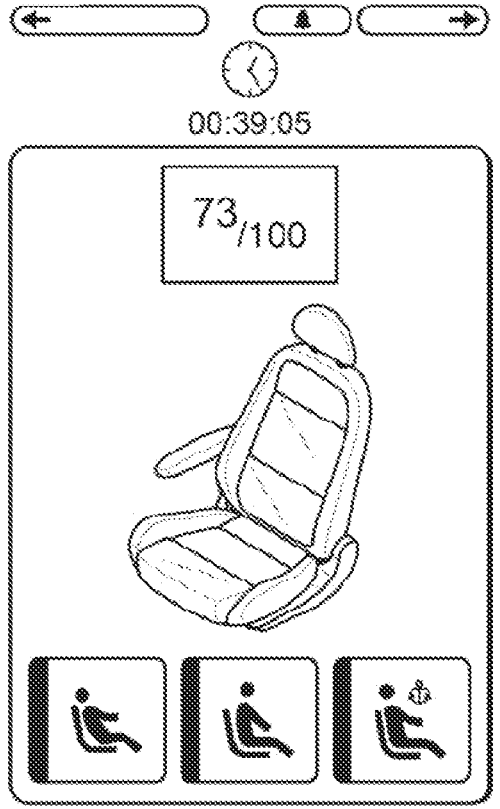
FIG. 7 shows an example of a rendering intended for an occupant of a vehicle seat with a visual depiction of an overall comfort index in the upper part and of several specific indices in the lower part.

Reference is now made to [FIG. 3] to [FIG. 7], which show examples of a user interface 16 (for example a screen) that can also act as an alert device, for example the first alert device 13₁ described above. Although the manner in which the information is presented is purely illustrative and non-limiting, the reader will deduce alternative embodiments therefrom. In particular, the use of colors is one possible means, but is difficult to show using monochrome figures. In this visual example, it is understood in particular that it is possible to quickly provide a user with general and easily understandable information, including during driving, in the form of icons, a "general score" ([FIG. 7]) or "tips" (written or voice). It is also possible to provide detailed information about the occupant's posture in order to assist the human in better adapting their posture, for example by distinguishing the parts of the body concerned ([FIG. 6]).

Figure 8:
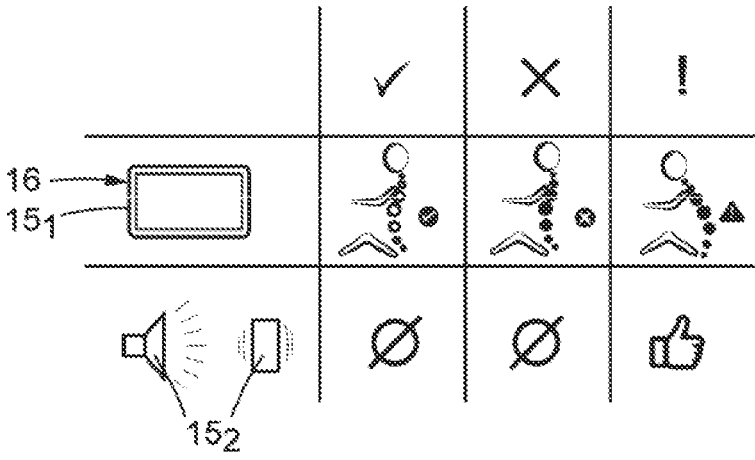
FIG. 8 shows an example of the type of alerts that can be generated based on situations as to the detected postures.

In embodiments for which two types of alerts can be generated based on the value of each comfort index relative to the two corresponding reference indices (sub-operations 1005₁ and 1005₂), it may be relevant to associate the first alert signal SIG1 with a first alert device 13₁ which is discreet (for example a display screen at the dashboard), while the second alert signal SIG2 is associated both with the first alert device 13₁ and with a second alert device 13₂ which is, by comparison, less discreet, for example a sound announcement or a vibrating unit. Thus, the occupant can choose to consult or ignore the screen, which can display information substantially in real time without thereby distracting or bothering the user. It is particularly relevant for information about the instantaneous indices to appear on the screen. As for the second alert device 13₂, it is instead relevant for it to activate more rarely and only when necessary by associating it only with the second alert signal SIG2 but not with the first alert signal SIG1, so that a ring or vibration disturbs the occupant only if one of the indices is in a critical range and not just an abnormal range, whether it is real-time information (instantaneous indices) or delayed information (combined indices). It may also be relevant to generate the second signal SIG2 only when combined indices exceed the second reference value, but not when instantaneous indices do. In doing so, triggering of an intrusive alert (here sound or haptic) is avoided when the occupant adopts a posture which, granted, is critical, but only for a brief instant. The table of [FIG. 8] schematically shows an example of such a configuration.

A maximum activation time limit, for example of the second alert device 13₂, may be provided, for example from one to ten seconds. Thus, even in case of a critical posture, an intrusive alert remains brief.

Figure 9:
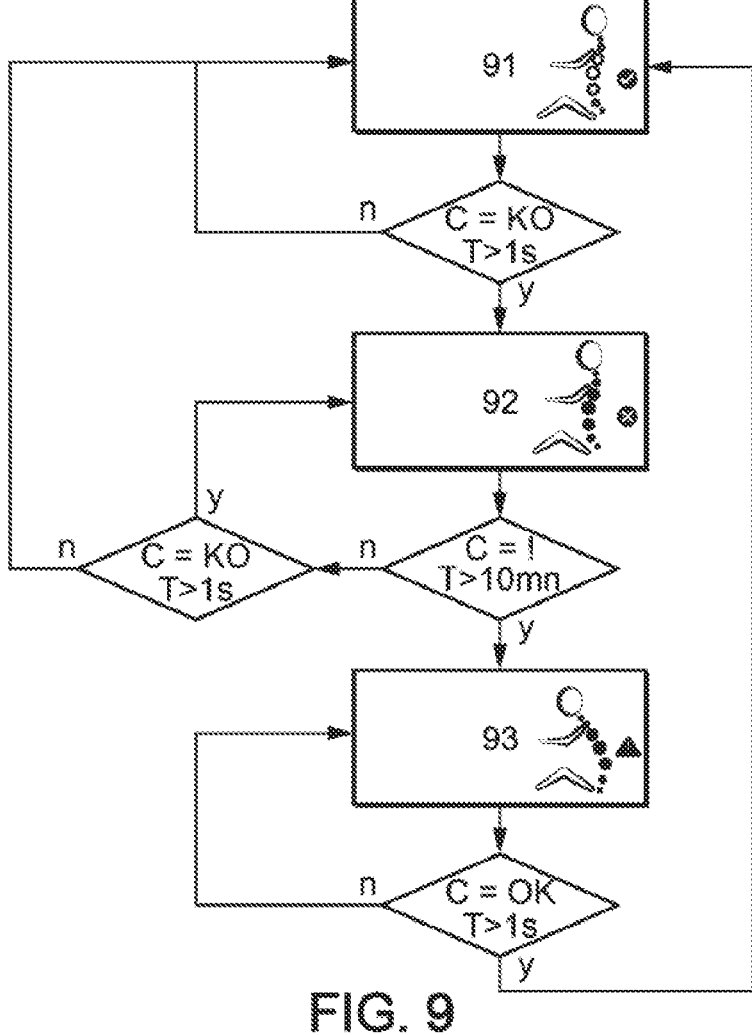
FIG. 9 shows an example embodiment of a type of alert over time.

Reference is now made to [FIG. 9], which depicts an alternative implementation of the fifth operation 1005. The information presented to the user is voluntarily time-delayed with respect to the signals from the sensors. The system transmits information continuously, but which is updated according to different chosen delays. The condition to switch from the display of a "normal" situation of box 91 to an "abnormal but non-critical" situation of box 92 is the detection of an abnormal, non-critical posture for a predefined period, for example 1 second. In other words, the analysis is carried out in real time, but on a sliding time window. The condition to return to a "normal" situation of box 91 can be similar: detection of a posture considered to be normal for a predefined duration, for example also 1 second. The condition to switch to a "critical" situation of box 93 can be similar: detection of a posture considered to be critical for a predefined duration, for example 10 minutes. It is preferable to choose greater durations for the conditions leading to a "critical" situation in order to limit intrusive alerts, in particular when this triggers a second type of alert which is more intrusive, such as a sound or a vibration. Like before, the condition to return to the "normal" or "abnormal but non-critical" situation may be the detection of a corresponding posture during a predefined period, for example 1 second. Alternatively, the conditions to switch from one state to the other can be refined. For example, to filter very brief occupant movements, rather than detecting a continuous posture during the sliding window, a threshold of less than 100% can be provided. For example, the change of state can be triggered as soon as the corresponding posture has been detected during X % of the total duration of the sliding window, for example 25%.

Figure 10:
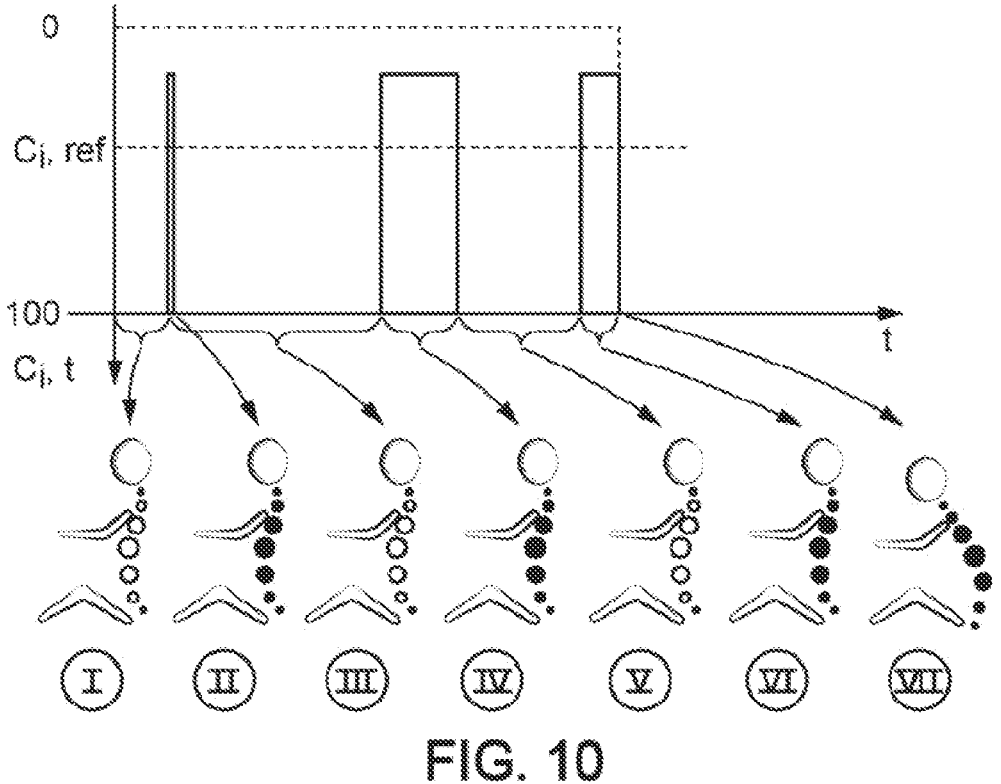
FIG. 10 shows an example scenario of the evolution of the generated alerts.

Reference is now made to [FIG. 10] depicting a sequence of an implementation scenario, the x-axis representing the time t, the dotted box depicting the sliding window, for example ten minutes, and the bottom part depicting what is displayed by the first alert device $13_1$:

during phase I, correct posture, no alert;
  during (brief) phase II, incorrect posture, slight alert SIG 1 (alert device $13_1$ only);
  during phase III, correct posture, no alert;
  during phase IV, incorrect posture, slight alert SIG 1 (alert device $13_1$ only);
  during phase V, correct posture, no alert;
  during phase VI, incorrect posture, slight alert SIG 1 (alert device $13_1$ only);
  at the end of phase VI, updating the slight alert SIG 1 (alert device $13_1$)+intrusive alert SIG 2 (alert device $13_2$), either because the incorrect posture phase VI has lasted beyond a predetermined limit duration, or because the comfort index has become less than the second reference value $C_{i,Ref2}$, or both.

Figure 11:
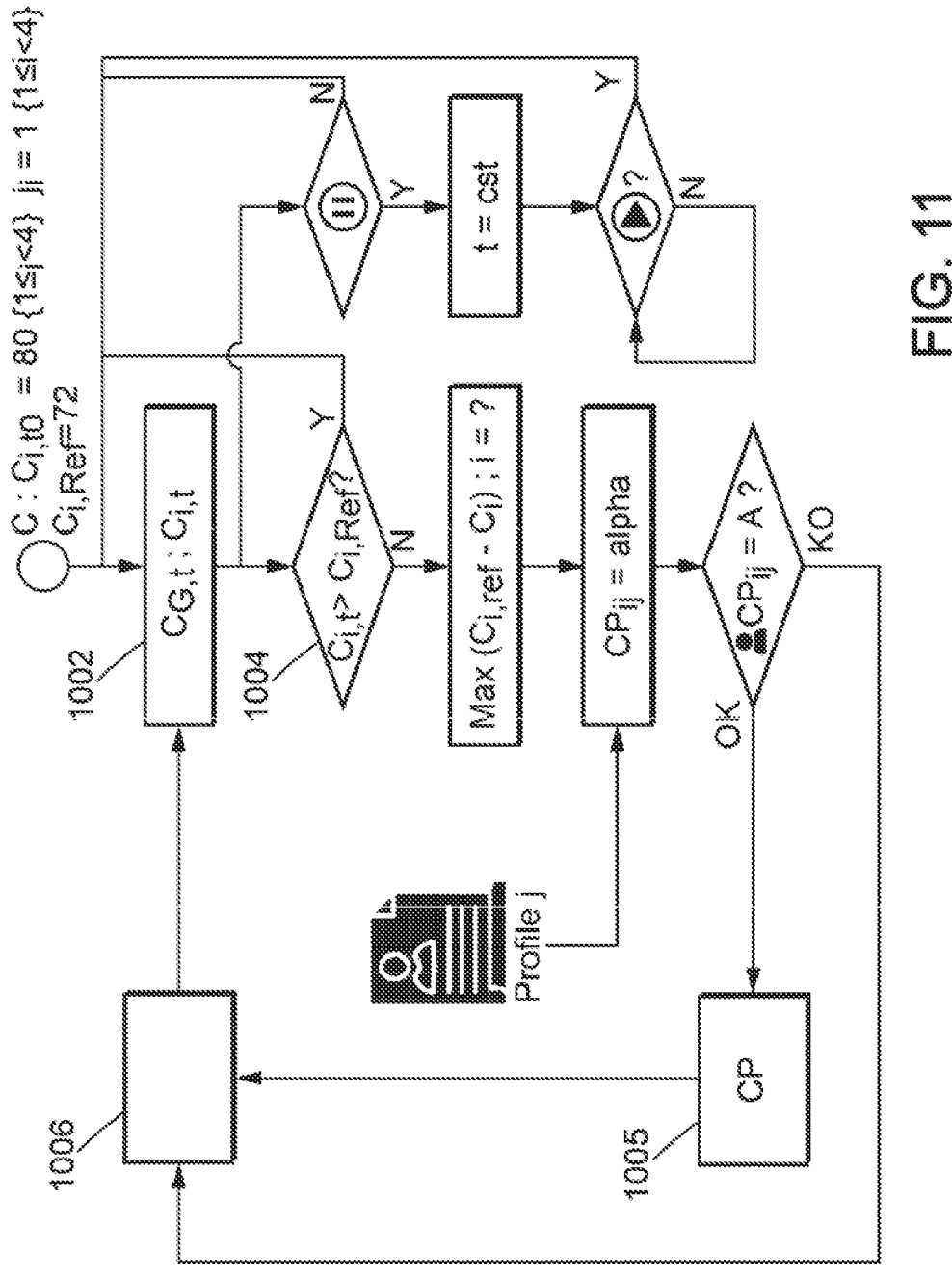
FIG. 11 shows an example implementation of an embodiment of a driving assistance method.

Reference is now made to [FIG. 11] depicting an example implementation of the method. The four indices implemented are those exemplified above. The values are first initialized, then the indices are calculated (1002), then compared (1004) with the reference values. To determine the countermeasures CP to be proposed, it is verified which of the indices is the poorest relative to its reference value (index i) and the occupant profile j is verified. In this example, these parameters allow the determination that the countermeasure $CP_{ij}$ "Alpha" is the one which should be proposed. The user can then accept ("OK") or refuse ("KO") the proposal. If they accept, the countermeasure is implemented (1005). The profile j is updated (1006) and any variables of the index to be corrected are reset, then the method is restarted. At any time, the method may be interrupted (paused) by the user. In this case, the elapsed time t can be virtually stopped (t is constant). If a countermeasure is refused ("KO"), the countermeasure is not implemented, but the profile is updated, for example by reducing the reference value $C_{i,Ref}$, so that the selection conditions of the next countermeasure are different.

Figure 12:
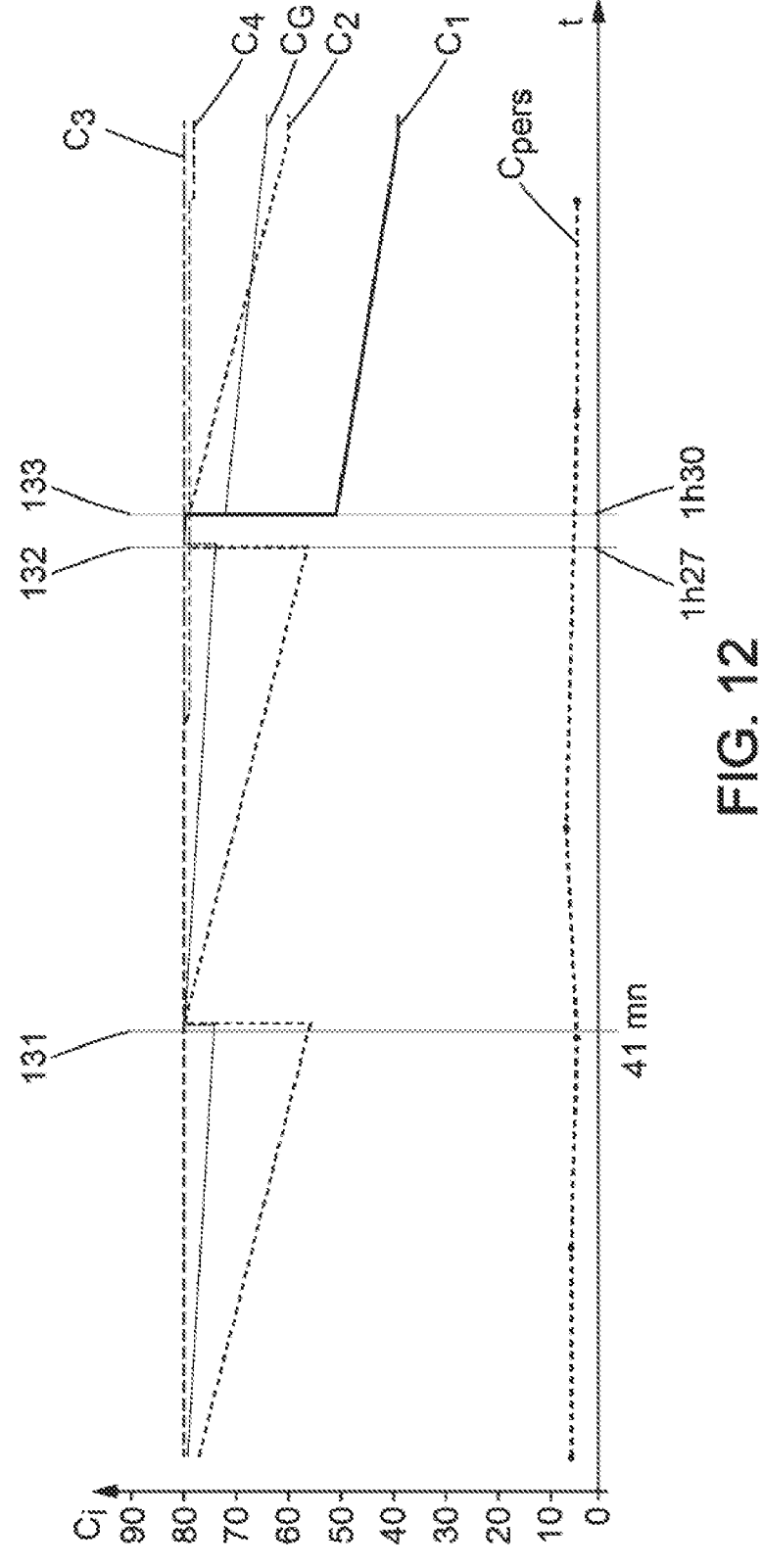
FIG. 12 shows the evolution over time of a set of indices during an experiment.

Reference is now made to [FIG. 12], which graphically shows the evolution of several indices over time. The x-axis shows the time elapsed since the start of a driving session. The values (between 0 and 100) of various indices are found on the y-axis. The indices $C_1$, $C_2$, $C_3$, $C_4$ and $C_G$ correspond to the examples above. The index $C_{Pers}$ is a comfort index declared by the user during the experiment (on a different scale from the base 100). During this experiment, the occupant's profile was as follows:

gender: male;
  age: 32 years;
  height: 177 cm;
  weight: 95 kg;
  generally experiences pain after one hour of driving;
  the lower back and the legs are the most sensitive areas.

The first marker $13_1$ at about 41 min corresponds to the identification that the index relating to an excessively fixed posture is the poorest of the indices measured and the proposal, accepted and then implemented, of a countermeasure: tilt movements. The second marker $13_2$ at about 1 hour and 27 minutes corresponds to the identification that the index relating to an excessively fixed posture is the poorest of the indices measured and the proposal, accepted and then implemented, of a countermeasure: lower back massage and breathing exercises. The third marker 133 at about 1 hour and 30 min corresponds to the identification that the index relating to the driving time is the poorest of the measured indices and the proposal of a countermeasure: take a break and stop. This time, the countermeasure is refused. The person continues to drive and the indices therefore continue to decrease.

The present disclosure therefore makes it possible both to facilitate and accelerate posture corrections, to prevent ailments that can occur in the event of a non-compliant posture, including postures for which the discomfort or pain is not immediately perceptible to the human. The alerts and information to be transmitted to the occupant can be better distinguished from one another upstream of their broadcasting. By using the system, it becomes possible to adjust both the quality and the quantity of the information provided while protecting the user from less relevant requests. In doing so, when the occupant is also a driver of the vehicle, the resultant risks of driving errors and accidents are also reduced.

The above examples are easily understandable in that they suggest exemplary usage context for a large number of readers, namely the posture of the driver in their motor vehicle seat, to whom information and alerts are transmitted during driving (while avoiding distracting the driver from their driving). However, it will be understood that the present disclosure is not limited to such a context. For example, the analyzed posture can be that of a first person (the occupant), such as a child passenger of the vehicle, while the alerts and information are transmitted to a second person (the user), for example the driver or any other occupant presumed to be an adult responsible for the child. It will also be noted that the alerts and information, and even the data from the sensors, could also be transmitted outside the vehicle by any suitable communication means, for example to emergency services in the event of an accident. In these cases, the user could be a person located outside the vehicle, for example in a testing context. The vehicles can further be different from an automobile, for example trains or aircraft. The usage context, and in particular the periods during which the occupant remains in the seat, can thus be substantially different from the usual contexts in the case of a motor vehicle used by a non-professional user.

This disclosure is not limited to the examples of methods, systems, computer programs and recording media for such programs which are described above, solely by way of example, but it encompasses all the variants that the reader may consider in the context of the protection sought.

Vehicle seats may be equipped with sensors capable of determining information on the posture of their occupants, in particular for detecting postures inappropriate for a situation and correcting them quickly.

Correcting the posture of an occupant of a vehicle seat generally aims to provide the proper operation of safety systems in the event of an incident, such as a seat belt and airbags in a motor vehicle, for example. This also helps the occupant to avoid a posture likely to promote the appearance of ailments or pain over the long term. When the occupant of the seat is also one of the drivers of the vehicle, limiting the occurrence of ailments, or even more simply of fatigue, leads to improving the safety of all vehicle occupants and nearby persons.

However, comparative systems may be configured to provide predetermined information based on each detected situation. Therefore, even if the user considers the information to be incorrect or irrelevant, he will receive the same predetermined information again each time the same situation is detected by the comparative system. When such comparative systems are too rigid and perceived as repetitive for users, these users may try to deactivate, bypass or ignore the system. This can generate particularly dangerous situations, which is counterproductive. Comparative systems that are too rigid may, in certain situations, produce effects counter to their purpose or give a false sense of security with respect to reality. In substance, the existing or envisaged systems are poorly suited to human expectations, which are, by nature, varied from one user to another and variable over time for each user.

Moreover, comparative systems are configured so as to alert the user as soon as an incorrect posture is detected. This may result in a large numbers of alerts and a user perception of an intrusive or oppressive system. In these cases, the user may seek to deactivate, bypass or ignore the system. One solution to the foregoing has been envisaged by the applicant: limiting the emission of an alert to situations wherein an anomaly is detected, continuously over a duration of a few minutes. Such a solution is not entirely satisfactory, since it is perceived as being erratic by users who expect to receive information in real time, which leads to the same rejection of the system by users.

In substance, the comparative systems are poorly suited to human expectations, which are varied from one user to another and variable over time for each user.

The present disclosure improves the situation.

A method is proposed for assisting in correcting the posture of an occupant of a vehicle seat. The method comprises:

a. collecting signals from a set of sensors as input, the sensors being jointly arranged so as to detect the posture of the occupant of the seat;

b. for each time step t at least, calculating based on the signals collected a set of one or more comfort indices by implementing at least one algorithm;

c. comparing each of the one or more comfort indices of the set to at least one respective reference value;

d. generating as output at least one signal intended for a user interface when one of the reference values is reached by the respective comfort index, the signal being selected from several possible signals based on prerecorded parameters specific to the occupant;

e. upon receiving a command received from the user interface in response to the generated signal, updating the prerecorded parameters specific to the occupant.

According to another aspect, an embedded system of a vehicle is proposed comprising:

a seat able to receive an occupant of the vehicle;

a set of sensors jointly arranged so as to detect the posture of the occupant of the seat and at least part of which are integrated into the seat;

a user interface able to receive commands from a user and to transmit information to the user; and a controller able to receive, as input, signals from the set of sensors and commands from the user interface, and to generate as output signals intended for the user interface. The controller is further configured to perform a method defined herein.

The features disclosed in the following paragraphs can optionally be implemented independently of one another or in combination with one another:

The method further comprises:

generating as output at least one actuation signal of an equipment item of the vehicle so as to implement a countermeasure when one of the reference values is reached by the respective comfort index.

The method further comprises:

e. upon receiving a command received from the user interface in response to the generated signal, and based on the received command, updating at least one behavioral parameter from the prerecorded parameters specific to the occupant.

At least one reference value is based on prerecorded parameters specific to the occupant. The method can therefore adapt to each potential occupant.

The series of operations is repeated at least once. The method can therefore be iterative and implemented substantially continuously.

The values of the comfort indices and/or the reference values evolve with time t, so that a reference value can be exceeded in a situation wherein the signals from the set of sensors correspond to the absence of detection of change in the occupant's posture over time t. The method also takes into account the harmful effect of an excessively fixed posture.

According to another aspect, a method is proposed for assisting in correcting the posture of an occupant of a vehicle comprising:

a. collecting signals from a set of sensors, the sensors being jointly arranged so as to detect the posture of the occupant of the seat;

b. for each time step t at least, calculating based on the signals collected a set of one or more comfort indices by implementing at least one algorithm;

c. comparing each of the one or more comfort indices of the set to at least one first reference value and at least one second reference value;

d. generating as output at least one first alert signal intended for a first alert device when the first reference value is reached by a first predetermined comfort index of the set;

e. generating as output at least one second alert signal intended for the first alert device and/or a second alert device when the second reference value is reached by the first predetermined comfort index and/or a second predetermined comfort index of the set.

Optionally, the values of the comfort indices and/or the values of the first and second reference values evolving with time t, so that the first reference value or the second reference value can be reached in a situation wherein the signals from the set of sensors correspond to the absence of detection of change in the occupant's posture over time t.

The features disclosed in the following paragraphs can optionally be implemented independently of one another or in combination with one another:

The set of one or more calculated comfort indices comprises:

an instantaneous comfort index, compared with the first reference value, and a combined comfort index corresponding to the combination of one or more instantaneous comfort indices of several previous time steps, compared with the second reference value, so that the first alert signal is generated substantially in real time while the generation of the second alert signal is delayed.

This allows information to be provided substantially in real time to the user when the user wishes, for example when he attempts to modify his posture, while preventing relatively irrelevant alerts from being generated at the slightest movement of the occupant.

The combined comfort index corresponding to the combination of one or more instantaneous comfort indices of several prior time steps extends over a total period of time between 1 and 30 minutes, and preferably between 5 and 20 minutes. Such an order of magnitude of the sliding window studied has shown good results.

The method further comprises:

f. interrupting the first alert signal and the second alert signal or keeping them inactive when the first predetermined comfort index stops reaching the first reference value, so that the two signals are stopped substantially in real time.

This makes it possible to avoid maintaining unpleasant alerts even though the situation has been corrected quickly by the occupant.

The first reference value and the second reference value are different from one another, so that generating the first alert signal and generating the second alert signal differ by quantitative differences in the set of one or more comfort indices. This excludes the particular cases where two strictly identical references would be used.

According to another aspect, an embedded system of a vehicle is proposed comprising:

a seat able to receive an occupant of the vehicle;

a set of sensors jointly arranged so as to detect the posture of the occupant of the seat and at least part of which are integrated into the seat;

a first alert device and a second alert device; and a controller able to receive signals from the set of sensors as input and to generate as output at least one first alert signal intended for the first alert device and a second alert signal intended for the second alert device.

The controller is further configured to implement a method defined above.

According to another aspect, a computer program is proposed comprising instructions for implementing all or part of a method as defined herein when this program is executed by a processor. According to another aspect, a non-transitory computer-readable recording medium is proposed whereupon such a program is recorded.

A method and a system for assisting in correcting the posture of an occupant of a vehicle seat (11), comprising:

a. collecting the posture of the occupant of the seat via sensors (12);

b. calculating comfort indices;

c. comparing them with reference values;

d. generating a first alert signal intended for a first alert device (13$_1$) when a reference value is reached;

e. generating a second alert signal intended for first and/or second alert devices (13$_1$, 13$_2$) when another reference value is reached.

The following numbered clauses include embodiments that are contemplated and non-limiting:

Clause 1. A method (1000) for assisting in correcting the posture of an occupant of a vehicle seat (11), comprising:

a. collecting (1001) as input signals from a set of sensors (12), the sensors being jointly arranged so as to detect the posture of the occupant of the seat;

b. for each time step t at least, calculating (1002, 1003) based on the signals collected a set (C) of one or more comfort indices ($C_{i,t}$, $C_{i,T}$) by implementing at least one algorithm;

c. comparing (1004) each of the one or more comfort indices ($C_{i,t}$, $C_{i,T}$) of the set (C) to at least one first reference value ($C_{i,Ref1}$) and at least one second reference value ($C_{i,Ref2}$);

d. generating (1005$_1$) as output at least one first alert signal (SIG1) intended for a first alert device (13$_1$) when the first reference value ($C_{i,Ref1}$) is reached by a first predetermined comfort index ($C_{i,t}$, $C_{i,T}$) of the set (C);

e. generating (1005$_2$) as output at least one second alert signal (SIG2) intended for the first alert device (13$_1$) and/or a second alert device (13$_2$) when the second reference value ($C_{i,Ref2}$) is reached by the first predetermined comfort index ($C_{i,t}$, $C_{i,T}$) and/or a second predetermined comfort index ($C_{i,t}$, $C_{i,T}$) of the set (C).

Clause 2. The method according to the preceding clause, wherein the set (C) of one or more calculated comfort indices ($C_{i,t}$, $C_{i,T}$) comprises:

an instantaneous comfort index ($C_{i,t}$), compared (1004) with the first reference value ($C_{i,Ref1}$), and a combined comfort index ($C_{i,T}$) corresponding to the combination of one or more instantaneous comfort indices ($C_{i,t-n}$; . . . ; $C_{i,t}$) of several previous time steps, compared (1004) with the second reference value ($C_{i,Ref2}$), so that the first alert signal (SIG1) is generated substantially in real time while the generation of the second alert signal (SIG2) is delayed.

Clause 3. The method according to the preceding clause, wherein the combined comfort index ($C_{i,T}$) corresponding to the combination of one or more instantaneous comfort indices ($C_{i,t-n}$; . . . ; $C_{i,t}$) of several prior time steps extends over a total period of time between 1 and 30 minutes, and preferably between 5 and 20 minutes.

Clause 4. The method according to one of the preceding clauses, further comprising:

f. interrupting the first alert signal (SIG1) and the second alert signal (SIG2) or keeping them inactive when the first predetermined comfort index ($C_{i,t}$) stops reaching the first reference value ($C_{i,Ref1}$), so that the two signals (SIG1, SIG2) are stopped substantially in real time.

Clause 5. The method according to one of the preceding clauses, wherein the first reference value ($C_{i,Ref1}$) and the second reference value ($C_{i,Ref2}$) are different from one another, so that the generation of the first alert signal (SIG1) and the generation of the second alert signal (SIG2) are distinguished by quantitative differences in the set (C) of comfort indices ($C_{i,t}$, $C_{i,T}$).

Clause 6. A system (1) embedded in a vehicle, comprising:

a seat (11) able to receive an occupant of the vehicle;

a set of sensors (12) jointly arranged so as to detect the posture of the occupant of the seat and at least part of which are integrated into the seat;

a first alert device ($13_1$) and a second alert device ($13_2$); and a controller (14) able to receive signals from the set of sensors as input and to generate as output at least one first alert signal (SIG1) intended for the first alert device ($13_1$) and a second alert signal (SIG2) intended for the second alert device ($13_2$), the controller further being configured to:

a. collecting (1001) as input signals from a set of sensors (12), the sensors being jointly arranged so as to detect the posture of the occupant of the seat;

b. for each time step t at least, calculating (1002, 1003) based on the signals collected a set (C) of one or more comfort indices ($C_{i,t}$, $C_{i,T}$) by implementing at least one algorithm;

c. comparing (1004) each of the one or more comfort indices ($C_{i,t}$, $C_{i,T}$) of the set (C) to at least one first reference value ($C_{i,Ref1}$) and at least one second reference value ($C_{i,Ref2}$);

d. generating ($1005_1$) as output at least one first alert signal (SIG1) intended for a first alert device ($13_1$) when the first reference value ($C_{i,Ref1}$) is reached by a first predetermined comfort index ($C_{i,t}$, $C_{i,T}$) of the set (C);

e. generating ($1005_2$) as output at least one second alert signal (SIG2) intended for the first alert device ($13_1$) and/or a second alert device ($13_2$) when the second reference value ($C_{i,Ref2}$) is reached by the first predetermined comfort index ($C_{i,t}$, $C_{i,T}$) and/or a second predetermined comfort index ($C_{i,t}$, $C_{i,T}$) of the set (C).

Clause 7. The system of clause 6, wherein:

the first alert device ($13_1$) comprises a visual indicator; and/or the second alert device ($13_2$) comprises a sound and/or haptic indicator.

Clause 8. A computer program comprising instructions for implementing the method according to one of clauses 1 to 5 when this program is executed by a processor.

Clause 9. A non-transitory computer-readable recording medium whereupon a program is recorded for implementing the method according to one of clauses 1 to 5 when this program is executed by a processor.

The invention claimed is:

1. A method for assisting in correcting the posture of an occupant of a vehicle seat, comprising:

a. collecting as input signals from a set of sensors, the sensors being jointly arranged so as to detect the posture of the occupant of the seat;

b. for each time step t at least, calculating based on the signals collected a set of one or more comfort indices by implementing at least one algorithm, wherein the set of one or more comfort indices comprises an instantaneous comfort index and a combined comfort index corresponding to the combination of one or more instantaneous comfort indices of several previous time steps;

c. comparing each of the one or more comfort indices of the set to at least one first reference value and at least one second reference value, wherein the instantaneous comfort index is compared with the first reference value and the combined comfort index is compared with the second reference value;

d. generating as output at least one first alert signal intended for a first alert device when the first reference value is reached by a first predetermined comfort index of the set;

e. while generating the first alert signal, generating as output at least one second alert signal intended for the first alert device and/or a second alert device when the second reference value is reached by the first predetermined comfort index and/or a second predetermined comfort index of the set;

wherein the first alert signal is generated substantially in real time while the generation of the second alert signal is delayed.

2. The method claim 1, wherein the combined comfort index corresponding to the combination of one or more instantaneous comfort indices of several prior time steps extends over a total period of time between 1 and 30 minutes.

3. The method claim 2, wherein the total period is between 5 and 20 minutes.

4. The method claim 1, further comprising:

f. interrupting the first alert signal and the second alert signal or keeping them inactive when the first predetermined comfort index stops reaching the first reference value, so that the two signals are stopped substantially in real time.

5. The method claim 1, wherein the first reference value and the second reference value are different from one another, so that the generation of the first alert signal and the generation of the second alert signal are distinguished by quantitative differences in the set of comfort indices.

6. A system embedded in a vehicle, comprising:

a seat able to receive an occupant of the vehicle;

a set of sensors jointly arranged so as to detect the posture of the occupant of the seat and at least part of which are integrated into the seat;

a first alert device and a second alert device; and a controller able to receive signals from the set of sensors as input and to generate as output at least one first alert signal intended for the first alert device and a second alert signal intended for the second alert device, the controller further being configured to:

a. collecting as input signals from a set of sensors, the sensors being jointly arranged so as to detect the posture of the occupant of the seat;

b. for each time step t at least, calculating based on the signals collected a set of one or more comfort indices by implementing at least one algorithm, wherein the set of one or more comfort indices comprises an instantaneous comfort index and a combined comfort index corresponding to the combination of one or more instantaneous comfort indices of several previous time steps;

c. comparing each of the one or more comfort indices of the set to at least one first reference value and at least one second reference value, wherein the instantaneous comfort index is compared with the first reference value and the combined comfort index is compared with the second reference value;

d. generating as output at least one first alert signal intended for a first alert device when the first reference value is reached by a first predetermined comfort index of the set;

e. while generating the first alert signal, generating as output at least one second alert signal intended for the first alert device and/or a second alert device when the second reference value is reached by the first predetermined comfort index and/or a second predetermined comfort index of the set, wherein the first alert signal is generated substantially in real time while the generation of the second alert signal is delayed.

7. The system of claim 6, wherein:
the first alert device comprises a visual indicator; and/or
the second alert device comprises a sound and/or haptic indicator.

8. A computing device comprising:
at least one processor;
a memory storing executable instructions that, when executed by the at least one processor, cause the computing device to:

a. collect input signals from a set of sensors, the sensors being jointly arranged so as to detect the posture of the occupant of the seat;

b. for each time step t at least, calculate, based on the input signals collected, a set of one or more comfort indices by implementing at least one algorithm, wherein the set of one or more comfort indices comprises an instantaneous comfort index and a combined comfort index corresponding to the combination of one or more instantaneous comfort indices of several previous time steps;

c. compare each of the one or more comfort indices of the set to at least one first reference value and at least one second reference value, wherein the instantaneous comfort index is compared with the first reference value and the combined comfort index is compared with the second reference value;

d. generate as an output at least one first alert signal intended for a first alert device when the first reference value is reached by a first predetermined comfort index of the set;

e. generate as an output at least one second alert signal, with the first alert signal, intended for the first alert device and/or a second alert device when the second reference value is reached by the first predetermined comfort index and/or a second predetermined comfort index of the set, wherein the first alert signal is generated substantially in real time while the generation of the second alert signal is delayed.

9. A non-transitory computer-readable recording medium whereupon a program is recorded for implementing the method according to claim 1 when this program is executed by a processor.

\* \* \* \* \*